United States Patent [19]

Aloi et al.

[11] 4,434,700
[45] Mar. 6, 1984

[54] AUTOMATED AMMUNITION MIXER

[75] Inventors: Anthony J. Aloi, Richmond; George D. Brooks, South Burlington; Ronald E. Prince, Colchester, all of Vt.

[73] Assignee: General Electric Company, Burlington, Vt.

[21] Appl. No.: 336,791

[22] Filed: Jan. 4, 1982

[51] Int. Cl.³ .......................... F41F 9/02; F42B 39/10; B65G 47/10
[52] U.S. Cl. .......................................... 89/34; 86/48; 89/33 BB; 89/33 SF; 198/370; 198/449; 221/123
[58] Field of Search ................. 89/33 SF, 33 B, 33 C, 89/34, 33 BB; 86/45, 46, 47, 48; 198/366, 370, 449, 451, 802; 221/253, 123, 225

[56] References Cited

U.S. PATENT DOCUMENTS

| 2,415,941 | 2/1947 | Edson | 86/48 X |
| 3,331,281 | 7/1967 | Jäfvert | 89/33 SF |
| 3,380,343 | 4/1968 | Chiabrandy | 89/12 |
| 3,429,221 | 2/1969 | Kirkpatrick | 89/33 R |
| 3,669,309 | 6/1972 | Romeo | 221/225 |
| 3,696,704 | 10/1972 | Backus | 89/34 |
| 4,004,490 | 1/1977 | Dix | 89/34 |
| 4,292,878 | 10/1981 | Brooks | 86/48 |

*Primary Examiner*—Donald G. Kelly
*Attorney, Agent, or Firm*—Bailin L. Kuch

[57] ABSTRACT

Ammunition sorting system including a plurality of storage hoppers each adapted to releasably store a different type of ammunition, and a conveyor system including in sequence a plurality of rungs, each rung having two alternative dispositions, one wherein the rung provides a pocket in the conveyor adapted to receive therein a round of ammunition from a hopper, the other wherein said rung precludes entry of a round into such pocket, and cams and followers for controlling the disposition of each rung as it passes each of the storage hoppers.

8 Claims, 12 Drawing Figures

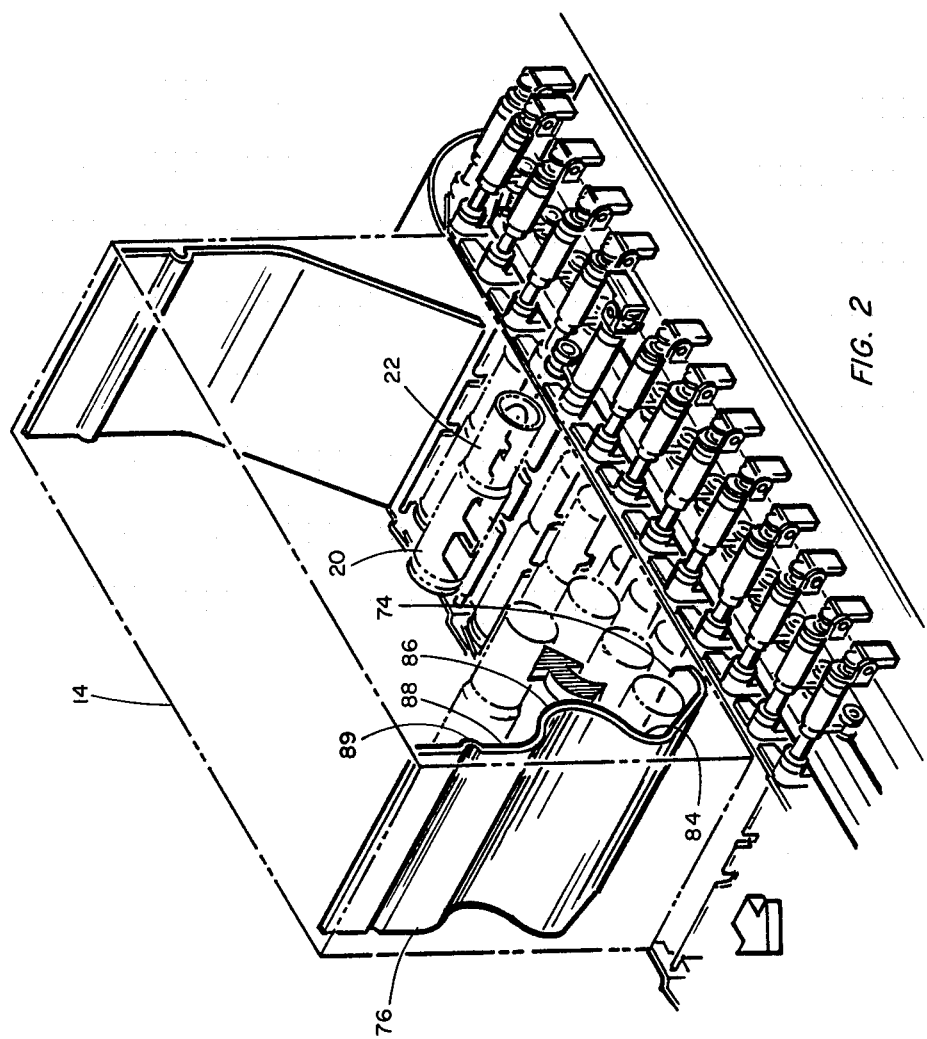

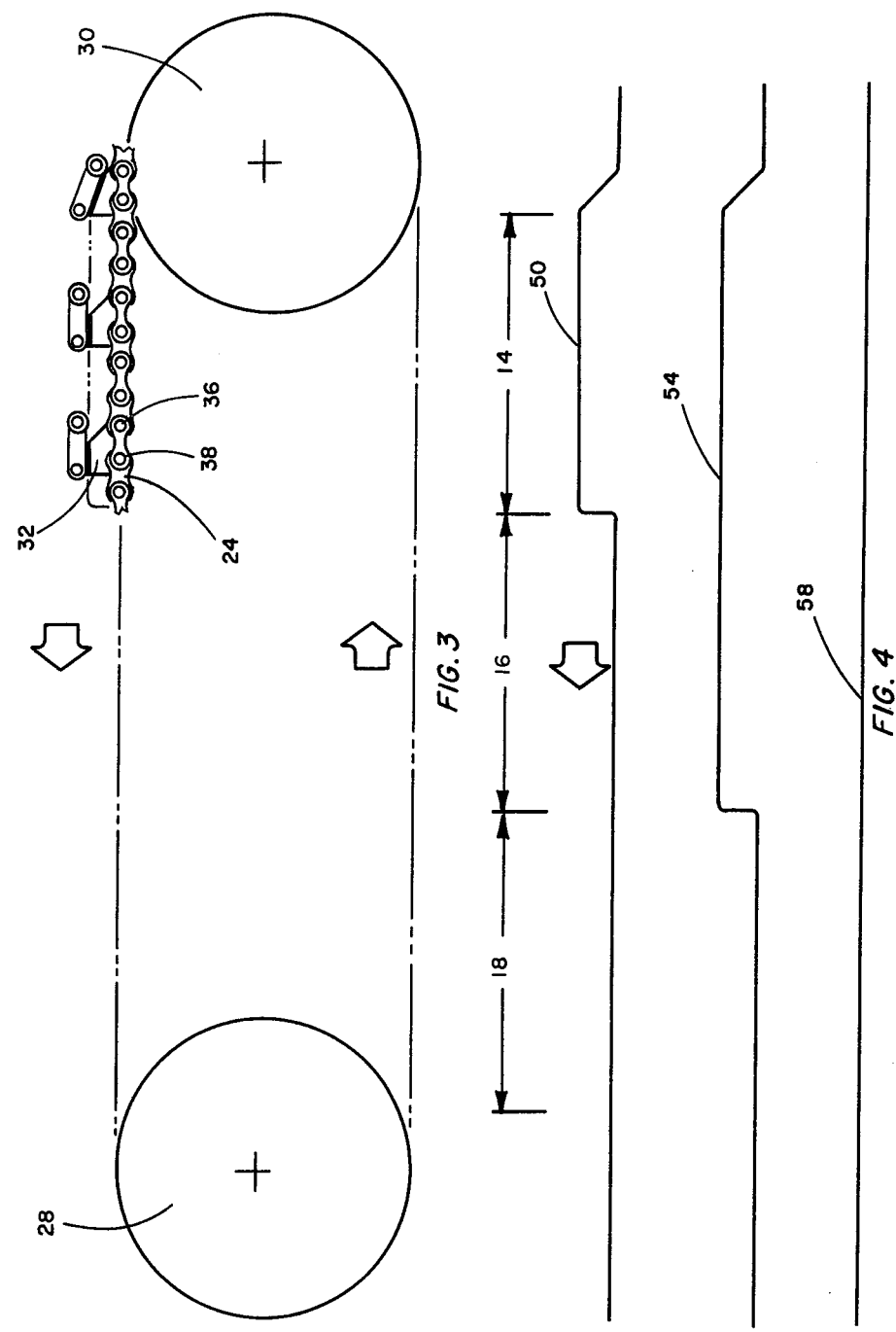

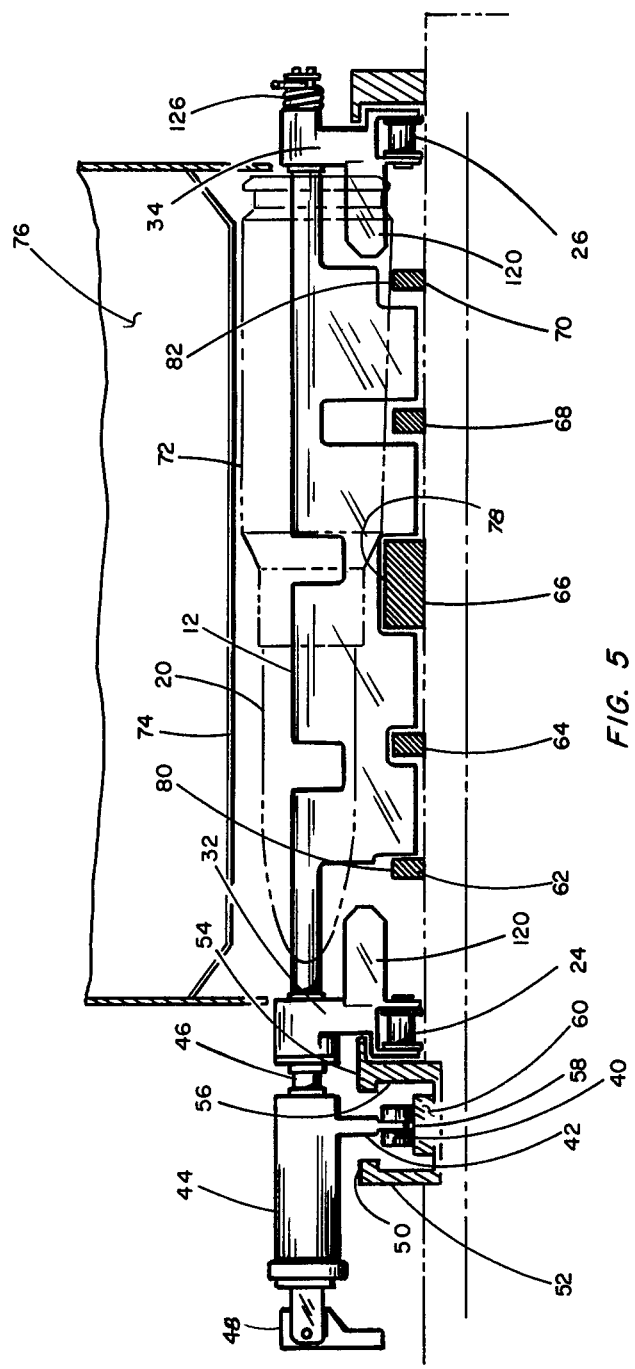

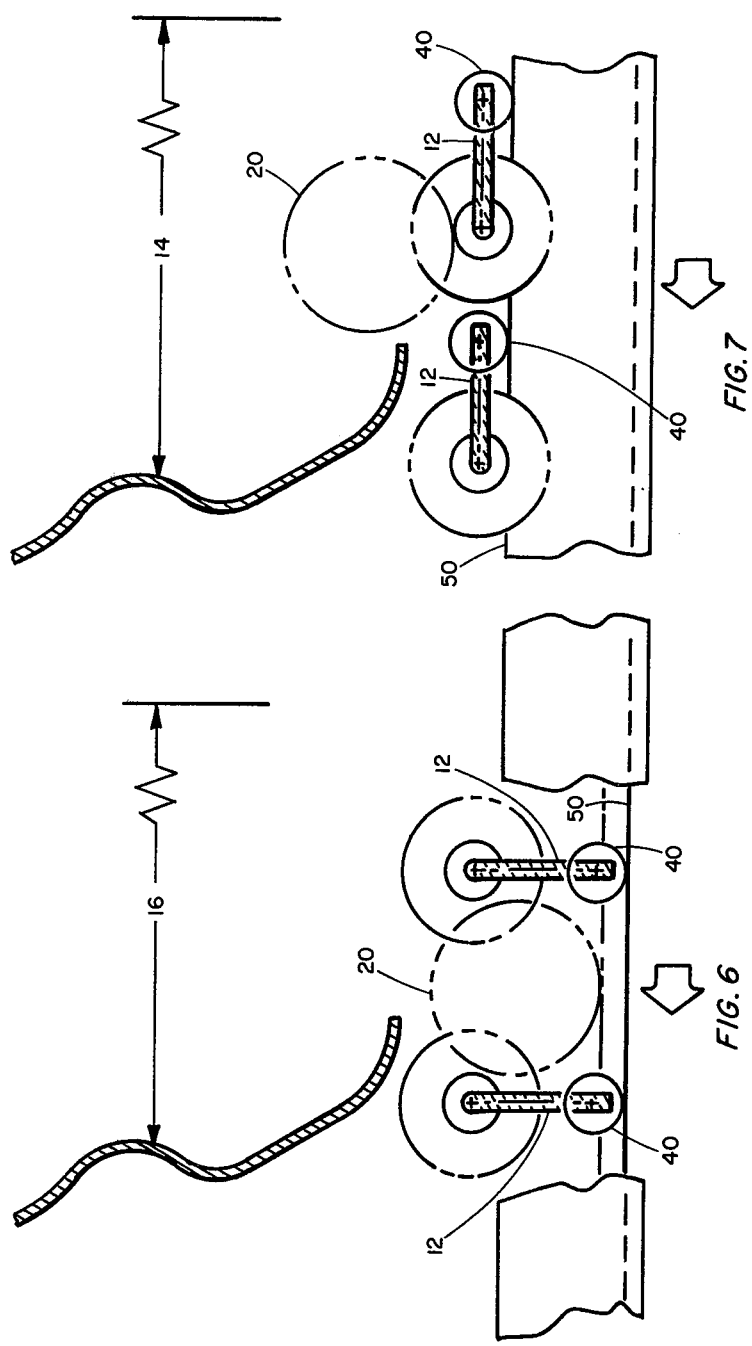

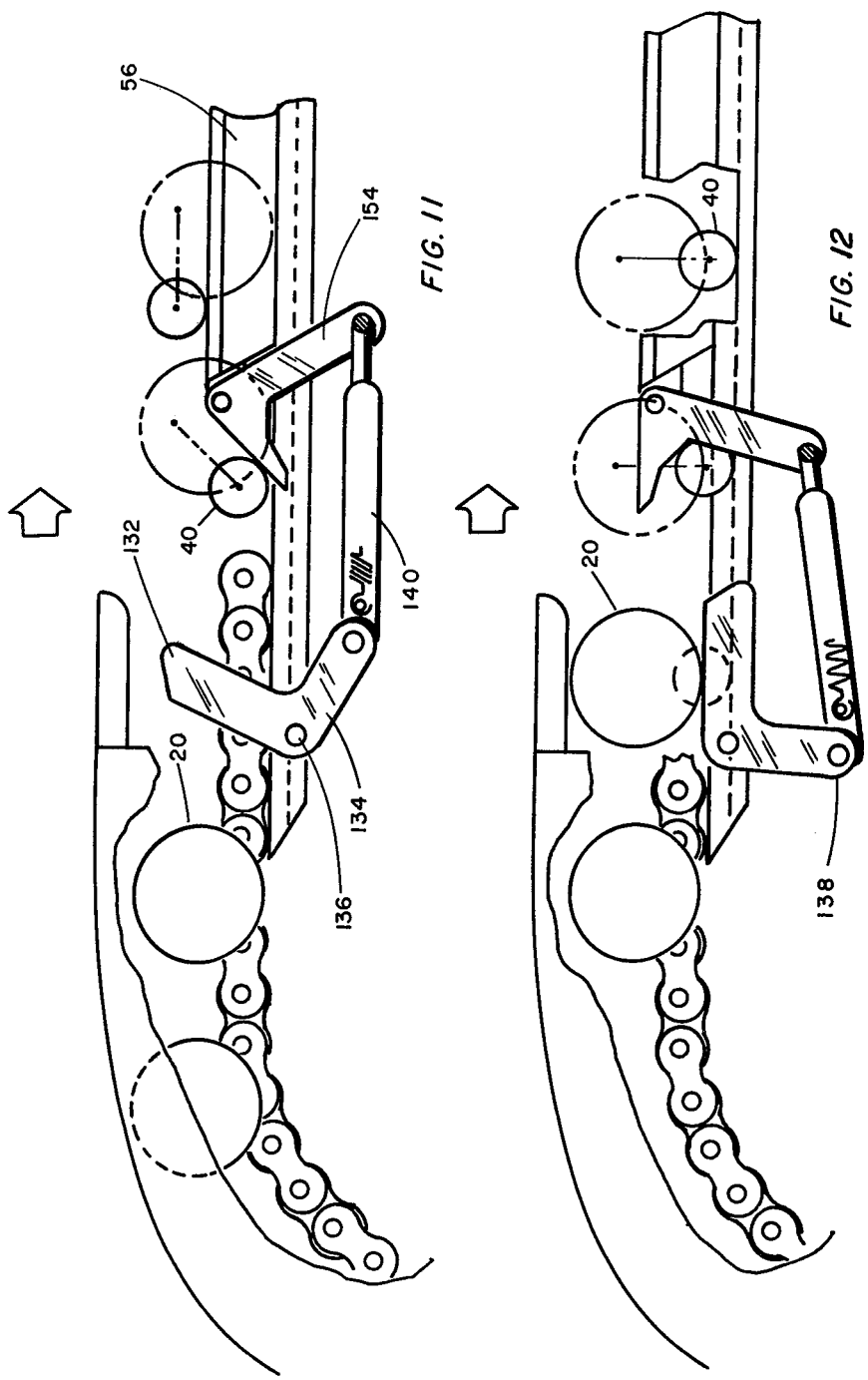

AUTOMATED AMMUNITION MIXER

BACKGROUND OF THE INVENTION

1. Field of the Invention

This invention relates to an automatic system for providing any one of a plurality of preselectable mixtures of different kinds of ammunition from a plurality of supplies to a conveyor system. The conveyor system, in turn, may be used to supply such ammunition to the ammunition storage system in an armament system.

2. Prior Art

Most high rate of fire guns, such as are shown, for example, in U.S. Pat. No. 3,380,343, issued Apr. 30, 1968 to R. E. Chiabrandy et al, utilize rounds of ammunition without links which are fed to the feeder of the gun by an endless conveyor such as is shown, for example, in U.S. Pat. No. 3,429,221, issued Feb. 25, 1969 to R. G. Kirkpatrick, from a storage system, such as is shown, for example, in U.S. Pat. No. 4,004,490, issued Jan. 25, 1977 to J. Dix et al. To provide quick aircraft loading turnaround time, the loading of the rounds into the storage system may use a bulk loader system, such as is shown, for example, in U.S. Pat. No. 3,696,704, issued Oct. 10, 1972 to L. F. Backus et al. This bulk loader system may be replenished by a replenisher, such as is shown, for example, in U.S. Pat. No. 4,292,878, issued Oct. 6, 1981 to G. D. Brooks et al.

As shown in Brooks et al, the bulk ammunition is available in two configurations: (1) Ammunition incorporating cardboard dunnage both in sheet form to separate the rounds from all sides of the container and in the form of tubes which respectively encase each individual projectile, with each round alternately oriented. (2) Loose bulk ammunition, without cardboard, as unfired rounds and cleared rounds from previous missions.

For many missions a mixture of different types of rounds of ammunition may be desired. An example might be: two armor piercing incendiary, two antipersonnel, one tracer. Different missions may require different mixtures.

Accordingly, it is an object of this invention to provide a system for automatically providing, seriatim, any selected one of a plurality of different mixtures of types of ammunition to a conveyor.

A feature of this invention is an ammunition sorting system including a plurality of storage means each adapted to releasably store a different type of ammunition, and a conveyor system including in sequence a plurality of rungs, each rung having two alternative dispositions, one wherein said rung provides a pocket in the conveyor adapted to receive therein a round of ammunition from a storage means, the other wherein said rung precludes entry of a round into such pocket, and means for controlling the disposition of each rung as it passes each of said storage means.

BRIEF DESCRIPTION OF THE DRAWING

These and other objects, advantages and features of the invention will be apparent from the following specification thereof taken in conjunction with the accompanying drawing in which:

FIG. 2 is a perspective detail view of one ammunition storage means and the conveyor of the system of FIG. 1;

FIG. 3 is a schematic of the conveyor of the system of FIG. 1;

FIG. 4 is a schematic of the three control cams for the conveyor of the system of FIG. 1;

FIG. 5 is a detail view in transverse cross-section through the conveyor of the system of FIG. 1 showing one rung of the conveyor, the control cams, and the guide rails for the rounds of ammunition;

FIG. 6 is a detail side view of the rung of FIG. 5 showing the rung in its pocket providing disposition;

FIG. 7 is a detail side view of the rung of FIG. 5 showing the rung in its round entry precluding disposition;

FIGS. 9, 10, 11, and 12 are detail views of the cam follower diverter mechanism of the system of FIG. 1.

DESCRIPTION OF THE INVENTION

Figure 1:
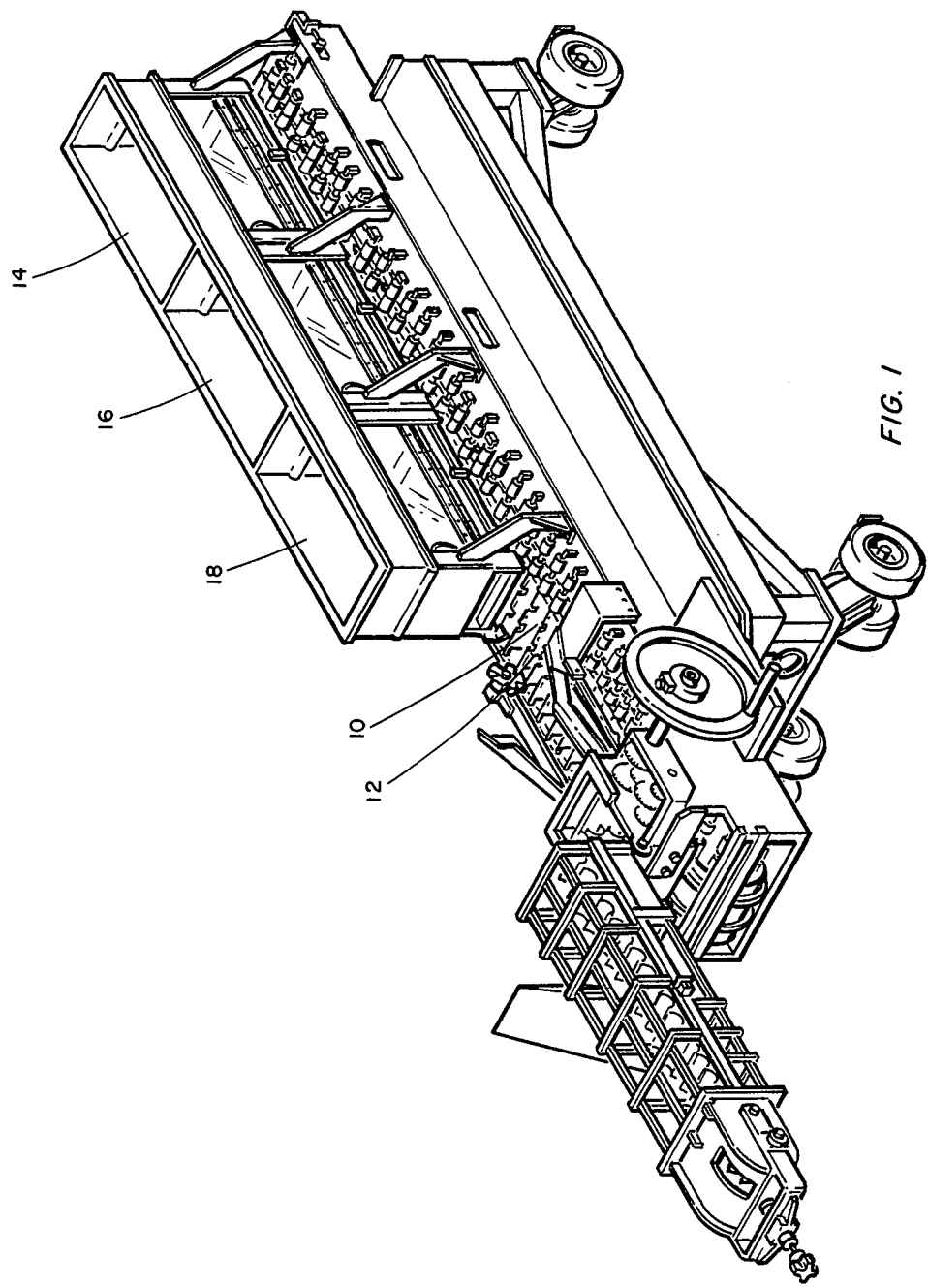
FIG. 1 is a perspective view of a system embodying this invention.

As seen in FIGS. 1 through 7, the system includes an endless conveyor 10, whose upper flight of rungs 12 passes underneath three ammunition storage hoppers 14, 16 and 18. Each of these hoppers may contain a different type of ammunition. The rounds of ammunition 20 may have cardboard sleeves 22 on the projectiles, or not. The rounds are disposed parallel to the rungs, but in either of the two possible orientations.

The endless conveyor 10 includes a pair of roller chains 24 and 26 which each pass around a respective driven sprocket wheel 28 and an idler sprocket wheel 30. Each rung 12 is pivotally supported between a pair of bearing brackets 32 and 34. Each bracket 32 or 34 is in turn mounted to two immediately adjacent pins 36 and 38 of a respective chain 24 or 26. A cam follower roller 40 is journaled to an arm 42 of a sleeve 44 which is attached to a concentrically located pin 46 with a detent which is part of the lock handle assembly 48. Handle 48 controls the detent which interlocks with any one of three cavities inside of sleeve 44 to permit the roller 40 to be transversely positioned in any one of three positions on the pin 46 which is pinned onto the pivotal rung 12. In position one, the roller is aligned with a first cam surface 50 of a cam track 52; in position two, it is aligned with a second cam surface 54 of a cam track 56; and in position three, it is disposed between the two cam surfaces on what may be considered to be a third cam surface 58 of a cam track 60.

As seen in FIG. 4, the cam surface 50 is raised under the hopper 14 and is low under the hoppers 16 and 18, the cam surface 54 is raised under the hoppers 14 and 16, and is low under the hoppers 18, and the cam surface 58 is low under the hopper 14, 16 and 18. When a cam follower roller 40 rides on a low cam surface, as shown in FIG. 6, its associated rung 12 is swung down, forming a pocket or carrier passageway with respect to the next preceding rung, which passageway is adapted to receive a round of ammunition 20. When a cam follower roller 40 rides on a raised cam surface, as shown in FIG. 7, its associated rung 12 is swung up, serving as a lid over the volume of the pocket, and precluding entry of a round into the volume. Thus, if a cam follower roller 40 is aligned to ride on the cam surface 50, as it initially passes under the hopper 14, its pocket will be closed and it will not accept a round from the hopper 14, but as it subsequently passes under the hopper 16, its pocket will be opened and it will accept a round from the hoper 16. If a cam follower roller 40 is aligned to ride on the cam surface 54, its pocket will be closed under the hoppers 14 and 16, and opened under the hopper 18 to accept a round from the hopper 18. If a cam follower roller 40 is aligned with the cam surface 58, its pocket will be open under the hoppers 14, 16 and 18, and it will accept a round from the hopper 14.

As seen in FIG. 5, each rung 12 has a plurality of lower cutouts, to clear a plurality of rails 62, 64, 66, 68, and 70 which are fixed in the path of the upper flight of the conveyor. The function of these rails is to so support each round 20 of ammunition, in either of its two possible orientations, so that the upper surface of the cartridge case 72 is parallel to but closely spaced beneath the lower edge 74 of the downstream endwall 76 of the hopper. To this end the central rail 66 provides a relatively high cartridge case engaging upper surface 78, while the end rails 62 and 70 each provide a relatively low cartridge case engaging upper surface 80 and 82, to accommodate the cone shape configuration of the case. The purpose of the lower edge 74 is to separate a round, which is resting on a lower round which is already disposed in a pocket in the conveyor, from such lower round and the top of the rung which is providing that pocket. These two rounds may have the same orientation or opposed orientations, and each may have a tube on its projectile, or not.

As seen in FIG. 2, the downstream endwall 76 of a hopper has an inner portion 84 with a curvilinear slope in the downstream-yet-upward direction from edge 74, an intermediate portion 86 with a reverse curve, and an upper portion 88 which is vertical and has an intermediate bump 89. The reverse curve serves to break the flow of rounds along and up the endwall 76, which flow would otherwise tend to pass over the top of the endwall. The flow is instead deflected back upstream within the hopper. The pump also serves to break any residual flow up the endwall.

Figure 8:
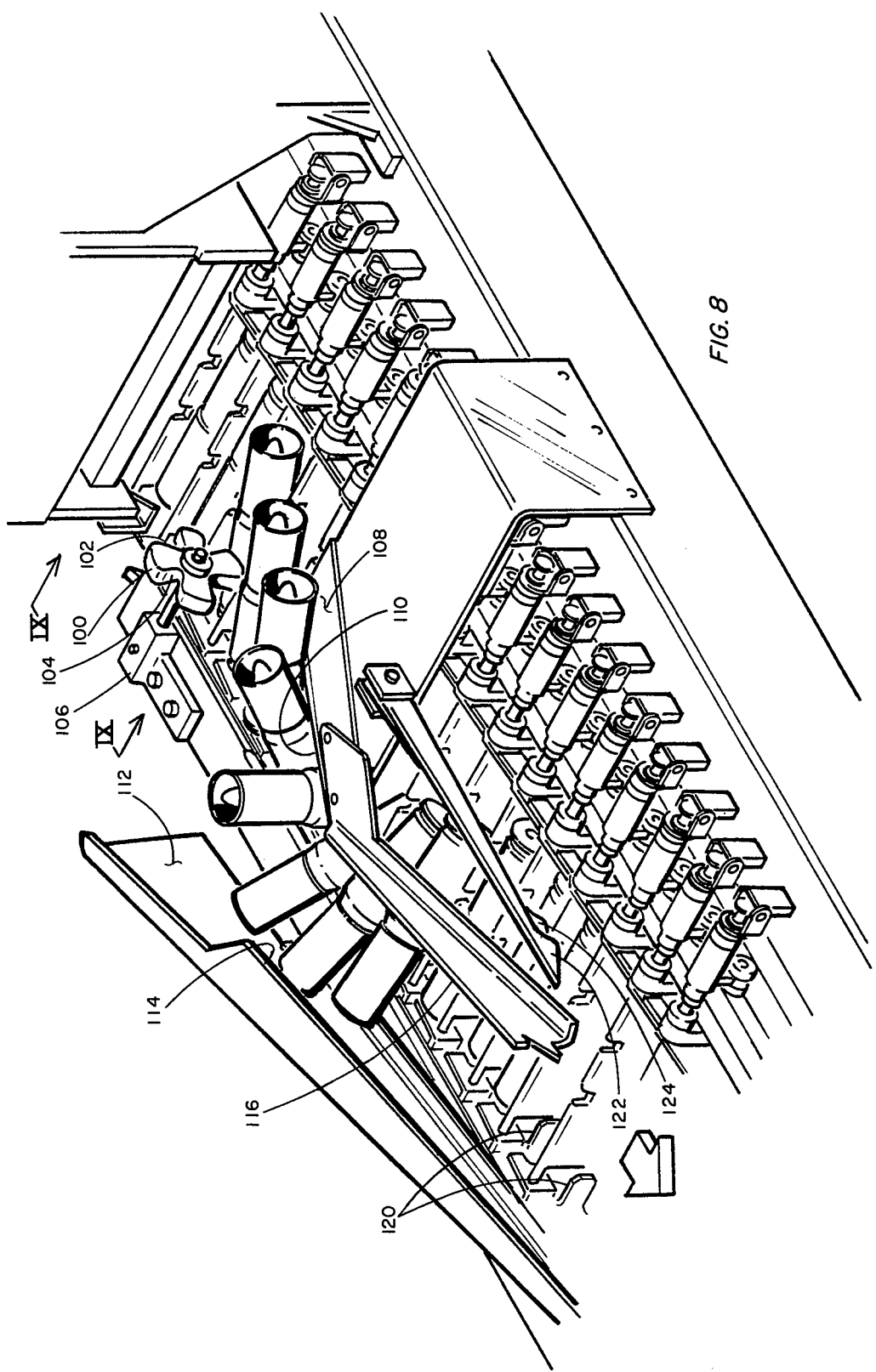
FIG. 8 is a detail view of the rounds reorienting subsystem of the system of FIG. 1.
Figure 9:
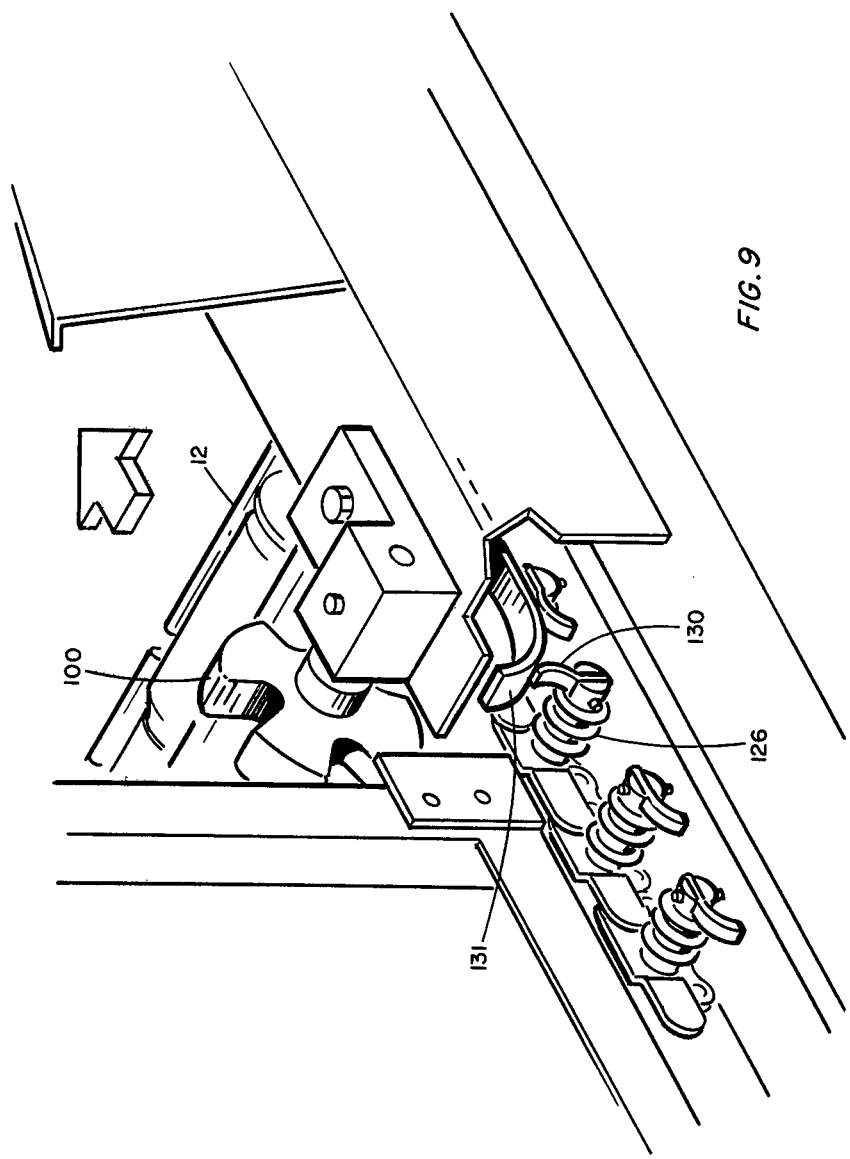

As seen in FIGS. 1 and 8, the upper flight of the conveyor receives rounds from the hoppers so that each of the pockets or passageways is filled with a respective round, and which round may have either one of two possible orientations, and have or not have a tube on its projectile. The upper flight then continues downstream to a rounds orienting and tube stripping system. As was taught in U.S. Pat. No. 4,292,878, the rounds are carried over a longitudinally extending recess or pocket in one side of the table surface. This table surface is a downstream continuation of the general surface on which rails 62 64, 66, 68 and 70 are mounted. The width of the recess is such that if a round of ammunition has its projectile over the recess, its center of gravity will be over the table; but if its base is over the recess, its center of gravity will be over the recess and the round, base down, will tilt into the recess, with the base riding along the bottom of the recess. However, it has been found that the base of a round may tend to hang up against the side of the conveyor and not fall promptly into the recess. To preclude such a hang up, a depressor cog wheel 100, having a plurality of convexities 102 and concavities 104, is journaled to a fixed support bracket 106 to overhang the conveyor over the table recess. The cog wheel is rotated by the upper portions of the rungs of the conveyor engaging the concavities. The convexities provide an initial push against the end of each round. If the end is a base, the round will continue to fall into the recess. If the end is a projectile, the round will return to the horizontal.

A reorienter cam plate 108 is fixed to the near sidewall and has a diagonal leading edge 110 which clears each round which is lying flat in the conveyor, but which abuts any round which is tilted into the recess. This leading edge progressively cams each tilted round upright as the conveyor carries it along, until the upper end of each round leaves the leading edge and falls over to ride on the far sidewall, while its lower end rides on the bottom of the recess. The bottom of the downstream end portion of the recess progressively ramps upwardly back to the level of the table surface. An aligner cam plate 112 is fixed to the far sidewall and abuts any round whose now-tilted-over end is riding on the far sidewall and progressively cams such rounds towards the near sidewall until such rounds fall off the far sidewall and are again flat in its respective pocket in the conveyor. A folded over portion 114 of plate 112 precludes any noses of tilted rounds from riding too far up the plate 112. An additional cam plate 116 is fixed over the conveyor, as an extension of the plate 108, to overlie any rounds being pushed by the aligner edge 114, to thereby prevent such rounds from hanging up on the aligner edge 114 and jumping out of their respective pocket in the conveyor.

To preclude the entrance of a projectile of a round, which is falling from a hopper into a pocket or passageway, into the immediately preceding volume of a pocket which is closed by having its rung 12 swung up, and inwardly directed tab 120 is fixed to each bearing bracket 32 and 34, as shown in FIG. 5. These tabs are aligned and flush with the respective rung when the rung is in its swung down, open pocket disposition. However, in usage, some misalignment of the tabs with their respective rungs may develop, so that a tab projects slightly into the following pocket. To preclude a misaligned tab 120 on the near chain from obstructing the base of a round which is being pushed by the cam 114, a pair of retarding levers 122 and 124 are provided as shown in FIG. 8. These levers are pivotally mounted to the structure supporting the cam plate 108 and have respective cam ends which ride against the rounds to momentarily retard them within their respective pocket, thereby deflecting them away from any misaligned tab.

A helical spring 126 is provided which is secured between the rung 12 and its bearing bracket 32 to bias the rung to its vertical, open pocket disposition against a stop (not shown) on the bracket. In the event that the spring and gravity fail to bring a rung to its full vertical disposition a cam follower trailing lever 130 is also fixed to the rung. As the rungs pass adjacent the cog wheel 100, the levers 130 pass under a cam plate 131 which insures that each lever is not upstanding and that, therefore, the respective rungs are vertical.

Figure 10:
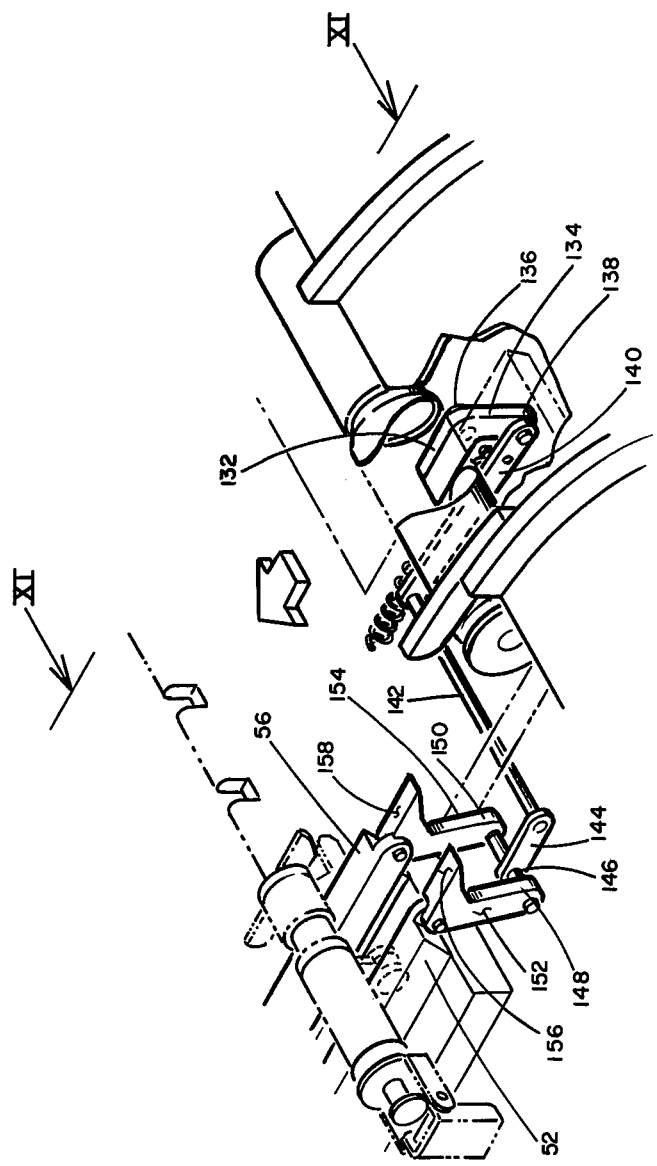

It may be desired to permit the rounds in the conveyor to recycle around and back under the hoppers. In such event, the rung, which has a round in back of it, must not be permitted to attempt to swing up. To accomplish this the cam follower diverting mechanism is provided as shown in FIGS. 10, 11 and 12. As a rung which has a round in front of it comes around the idler sprocket wheels, the round strikes the upstanding end 132 of a crank lever 134. The lever is pivotally mounted at 136 to the table and biased by a spring so that the end 132 is up. The lower end 138 is coupled to one end of push lever 140, whose other end is coupled to one end of a cross rod 142, whose other end is coupled to one end of a push lever 144, whose other end is coupled to a cross rod 146. The cross rod 146 is coupled to the lower ends 148 and 150 of a pair of crank levers 152 and 154 respectively which are pivotally mounted to the ends of the cam tracks 52 and 56 respectively. The tracks are upside-down-L-shape with the cam surfaces 50 and 54 on the upper surface of the foot of the L-shape. The upper ends 156 and 158 of the crank levers are also upside-down-L-shaped. When the lever end 132 is up, the lever ends 156 and 158 are swung down, and the upper surfaces of their feet serve as ramps for the cam follower roller 40 of the specific rung to ride up onto the cam surface 50 or 54 if it is aligned therewith as shown in FIG. 11. When the lever end 132 is down, the lever ends 156 and 158 are swung up, and the cam follower roller 40 rides under the lever end 156 or 158, if it is aligned therewith, and continues under the respective cam surface, as shown in FIG. 12.

What is claimed is:

1. An ammunition sorting system comprising:
   a plurality of storage means, each adapted to releasably store a different type of ammunition;
   a conveyor system including in sequence a plurality of rungs,
     each rung movable between two alternative positions,
     one position wherein said rung provides a passageway in the conveyor adapted to receive therein a round of ammunition from one of said plurality of storage means,
     the other position wherein said rung precludes entry of a round into said passageway; and
   means for selecting the position of each rung as it passes each of said plurality of storage means.

2. A system according to claim 1 wherein:
   said means for selecting the position of each rung includes,
     a plurality of cam followers, each coupled to a respective rung; and
     a cam means for controlling each of said cam followers.

3. A system according to claim 2 wherein:
   said cam means includes
   a plurality of cam surfaces whereby each cam surface is adapted to cause one of said cam followers to move its respective rung to and from either of its positions to or from the other of its positions.

4. A system according to claim 3 wherein:
   said conveyor system further includes a
     pair of spaced apart endless chains,
     a plurality of pairs of brackets, one of each pair of brackets carried by a respective one of said pair of chains,
   each of said plurality of rungs being carried by and between a respective pair of said brackets.

5. A system according to claim 4 wherein:
   each of said rungs is journaled to said respective pair of brackets for pivotal movement to and between said two alternative positions.

6. A system according to claim 1 wherein:
   said passageway has an open top and an open bottom, and further including
   means for closing said open bottom.

7. A system according to claim 1 wherein:
   said conveyor system is endless and includes
     an upper flight of rungs spaced adjacent to said plurality of storage means, and
     a lower flight of rungs spaced remote from said plurality of storage means,
     whereby each of said passageways receives, if at all, a round of ammunition from one of said storage means while it is in said upper flight, and each of said passageways progresses from said upper flight to said lower flight and again to said upper flight.

8. A system according to claim 7 further including
   means for precluding any of said rungs which provides a passageway which contains a round of ammunition from attempting to shift from said one position to said other position as it would otherwise be controlled by said means for selecting the position of said rung upon progression from said lower flight to said upper flight.

* * * * *